US012783720B2

(12) United States Patent
Philip et al.

(10) Patent No.: US 12,783,720 B2
(45) Date of Patent: Nov. 3, 2026

(54) SENSITIVE DATA LEAKAGE PREVENTION

(71) Applicant: BANK OF AMERICA CORPORATION, Charlotte, NC (US)

(72) Inventors: Charles Chandy Philip, Mumbai (IN); Vaibhav Bansal, Delhi (IN); Sejal Dinesh Pardeshi, Badlapur (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 121 days.

(21) Appl. No.: 18/800,511

(22) Filed: Aug. 12, 2024

(65) Prior Publication Data

US 2026/0044623 A1 Feb. 12, 2026

(51) Int. Cl.
*G06F 21/62* (2013.01)

(52) U.S. Cl.
CPC ................................ *G06F 21/6245* (2013.01)

(58) Field of Classification Search
CPC .................................................. G06F 21/6245
See application file for complete search history.

(56) References Cited

U.S. PATENT DOCUMENTS 8,719,938 B2 5/2014 Chasko et al.
9,576,133 B2 2/2017 Kocher et al.
10,326,803 B1 6/2019 Haney
11,483,157 B2 10/2022 Chow et al.
11,934,567 B2 3/2024 Evans et al.
2020/0349298 A1* 11/2020 Nagpal ............... G06F 21/6209
2025/0254045 A1* 8/2025 Yang ......................... H04L 9/32

FOREIGN PATENT DOCUMENTS

WO 2020071706 A1 4/2020

* cited by examiner

*Primary Examiner* — Oleg Korsak
(74) *Attorney, Agent, or Firm* — Moore & Van Allen PLLC; Nicholas C. Russell

(57) ABSTRACT

A comprehensive system for sensitive data leakage protection. Text extracted from documents and images that is to be transmitted/communicated is scanned to detect ciphertext within a document or image. Machine learning models are trained and executed to analyze the datum to determine data classifications and deep learning models are self-trained and executed to detect emerging data points (i.e., new threats affecting the ability to classify data) and feeds such emerging data points back to the machine learning model(s). Intelligence capable of receiving findings from the ciphertext detection component as well both the machine learning and the deep learning is executed to determine a level of sensitive data leakage attributed to each dataset being transmitted/communicated and, in response to determining the level of sensitive date leakage, make real-time decisions on whether to allow, hold or block the data transmission/digital communication.

15 Claims, 7 Drawing Sheets

SENSITIVE DATA LEAKAGE PREVENTION

FIELD OF THE INVENTION

The present invention is generally directed to data security and, more specifically, preventing leakage of sensitive data in digital communications and data transmissions.

BACKGROUND

In today's interconnected digital landscape, the protection of sensitive data has become paramount. With the exponential growth in data sharing across diverse platforms, there exists an ever-present peril of inadvertent leakage or unauthorized access to sensitive information. This peril not only jeopardizes individual privacy but also threatens the integrity and trustworthiness of businesses, institutions, and governmental entities alike.

Current methods of data protection often rely on encryption and access controls to safeguard sensitive information during storage and transmission. While effective to a certain extent, these approaches may fall short in scenarios where data is inadvertently leaked due to human error, system vulnerabilities, or malicious intent.

Addressing these challenges requires a comprehensive solution that not only secures data but also actively prevents its unauthorized disclosure. Such a solution must encompass advanced mechanisms capable of detecting, mitigating, and alerting against potential data leakage incidents in real-time, thereby ensuring robust protection against both internal and external threats.

Therefore, a need exists to develop apparatus, computer-implemented methods, computer program products or the like that efficiently identify actual and/or potential sensitive data in digital communications and data transmissions and serve to intelligently determine whether such communications and/or transmissions should be allowed to proceed, held for further investigation, or blocked.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing for a comprehensive system for sensitive data leakage protection. The system realizes that within a large enterprise data is transmitted/communicated via various channels and, therefore, the system provides for data being analyzed to originate from various data sources including, but not limited to, cloud storage environments, mass storage devices, data centers and media of conversation/messaging service applications and the like. Such data will be received by the system in raw and unstructured format and, as a result the system provides for normalizing/structuring the data (i.e., converting the data to a standard format) prior to subsequent processing.

The system further realizes that data transmissions and/or digital communications will include both document data including spreadsheets and the like, and image data including screenshots and the like. Therefore, the system provides for implementing image character recognition techniques or the like to detect textual datum in images and convert such images into machine-readable text.

Paramount to the system is the ability to scan the text extracted from the documents and the images to detect ciphertext (i.e., encryption performed at the text level). In this regard, nefarious entities desiring to communicate/transmit sensitive data may seek to avoid detection mechanisms by implementing ciphertext as a means for masking the sensitive data. The present system provides the ability to detect documents/images that include entirely ciphertext as well as isolated incidents (e.g., one or few words or phrases) in a document or image that otherwise comprises plaintext (i.e., human-readable unencrypted text).

Equally, paramount to the system is the implementation of machine learning and deep learning. The system implements machine learning that has been trained on both supervised and unsupervised learning to analyze the datum in the datasets (i.e., within a specific data transmission or digital communication) to determine data classifications. Specifically, to determine whether datum (i.e., words of phrases or the like) should be classified as public, private and/or confidential. The system implements continuous deep learning, which is self-trained, to detect emerging data points (i.e., new threats affecting the ability to classify data) and feeds such emerging data points back to the machine learning model(s).

Moreover, the system implements intelligence capable of receiving findings from the ciphertext detection component as well both the machine learning and the deep learning to determine a level of sensitive data leakage attributed to each dataset being transmitted/communicated and, in response to determining the level of sensitive date leakage, make real-time decisions on whether to allow an ongoing data transmission/digital communication to proceed, hold the data transmission/digital communication for further investigation or block the data transmission/digital communication altogether. Additionally, the system provides for an analytics dashboard that allows investigative entities to view visual data associated with the outcomes of the ciphertext detection, machine learning and deep learning components for purposes of dispositioning data transmissions and digital communications having hold statuses. Moreover, the system provide for adding visual indicators within documents and images that indicate the location of ciphertext and datum classified as private and/or confidential. The visual indicator may take the form of encircling or otherwise highlighting the ciphertext or private/confidential datum. Such documents and images with visual indicators are presented or otherwise made available for viewing within the analytics dashboard.

A system for sensitive data leakage prevention defines first embodiments of the invention. The system includes a computing platform having a memory and at least one computing processor device in communication with the memory. The memory stores a sensitive data leakage prevention system that is executable by one or more of the at least one computing processor devices. The sensitive data leakage prevention system includes a data collection engine configured to (i) receive, from a plurality of data sources, data sets comprising data and designated for computing network transmission and (ii) segregate the data within the data sets based on data type, wherein data type includes document data and image data. The data sets may be digital communications such as messaging service messages, electronic mail or the like or more voluminous data sets requiring cloud service communication, peer-to-peer networks, file transfer protocol (FTP) communication or the like. As such the data sources may include, but are not limited to, cloud storage, internal data centers, mass storage devices (e.g., servers and the like comprising HDD, SSD or the like), and user-to-user messaging/media of conversation (MOC) service applications and the like.

The sensitive data leakage prevention system further includes a cryptography engine configured to scan (i) first textual datum extracted from the document data and (ii) second textual data extracted from the image data to detect ciphertext within the document data and the image data. In addition, the sensitive data leakage prevention system further includes a machine learning engine including one or more machine learning models trained on supervised and unsupervised learning and configured to analyze the first and second textual datum to determine a data classification for each first and second textual datum. The data classification is selected from a group consisting of (i) public data, (ii) private data and (iii) confidential data. Additionally, the sensitive data leakage prevention system further includes a deep learning engine including one or more deep learning models that self-train and are configured to identify emerging data points that impact data classification and continuously feed the emerging data points to the machine learning models.

The sensitive data leakage prevention system further includes an intelligence engine configured to receive outputs from (i) the cryptography engine including detected ciphertext within the document data and the image data, (ii) the machine learning engine and (iii) the deep learning engine and analyze the outputs to determine a level of sensitive data leakage attributed to each data set.

In specific embodiments of the system, the intelligence engine if further configured to determine, within real-time of the data collection engine receiving the data set, whether the data set should be prohibited from transmission to an intended data recipient based on the level of sensitive data leakage attributed to the data set. In other words, determining whether or not block or otherwise hold a data transmission until an investigative entity can assess the need for the sensitive data.

In other specific embodiments of the system, the cryptography engine is further configured to scan the first textual datum extracted from the document data and the second textual data extracted from the image data to detect ciphertext from amongst a plurality of clear text within the document data and the image data. In other words, the scanning is able to detect isolated incidents of ciphertext embedded amongst otherwise clear/plain text.

In further specific embodiments the system includes a processing engine configured to receive the data sets from the data collection engine in unstructured format and normalize/convert the data sets including reformatting the datasets to a structured format ingestible by the cryptography engine, the machine learning engine, the deep learning engine, and the intelligence engine. In related embodiments of the system, the processing engine is further configured to receive (i) from the cryptography engine, indications of detected ciphertext within the document data and the image data and (ii) from the machine learning models, indications of the textual datum and extracted textual datum classified as private data and confidential data. In response to receiving the indications, generate a visual indicator disposed within the document data and the image data that indicates locations within a document or an image of (i) the ciphertext, and (ii) the first textual datum and second textual datum classified as private data and confidential data. For example, the ciphertext and datum classified as private or confidential may be encircled within the document or image or otherwise highlighted. In other related embodiments of the system, the processing engine is further configured to identify noisy data in the data set that remains unstructured after normalizing the data set and filter the noisy data from the data set prior to subsequent (i.e., prior to forwarding the data to the cryptography engine, and the machine and/or dep learning engines).

In further embodiments of the system, the sensitive data leakage prevention system includes an optical character recognition engine configured to extract the second textual datum from the image data, and a document engine configured to extract the first textual datum from the document data.

Moreover, in other specific embodiments of the system, the sensitive data leakage prevention system includes an analytic dashboard application that is in communication with the intelligence engine and configured to present, to an investigative entity, the outputs from (i) the cryptography engine including detected ciphertext within the document data and the image data, (ii) the machine learning engine and (iii) the deep learning engine and the level of sensitive data leakage attributed to each data set.

A computer-implemented method for sensitive data leakage prevention defines second embodiments of the invention. The computer-implemented method is executed by one or more computing processor device. The computer-implemented method includes receiving, from a plurality of data sources, data sets including data, which are designated for computing network transmission and segregating the data within the data sets based on data type (e.g., document data and image data). In addition, the computer-implemented method includes scanning first textual datum extracted from the document data and second textual data extracted from the image data to detect ciphertext within the document data and the image data.

Additionally, the computer-implemented method includes implementing one or more machine learning models, trained on supervised and unsupervised learning, to analyze the first and second textual datum to determine a data classification for each first and second textual datum within the data. The data classification is selected from a group consisting of (i) public data, (ii) private data and (iii) confidential data. Further, the computer-implemented includes implementing one or more deep learning models, which self-train, and to identify emerging data points that impact data classification and continuously feed the emerging data points to the machine learning models.

In addition, the computer-implemented method includes analyzing the detected ciphertext within the document data and the image data, and outputs from the machine learning model(s) and the deep learning model(s) to determine a level of sensitive data leakage attributed to each data set.

In specific embodiments the computer-implemented method further includes determining, within real-time of receiving the data set, whether the data set should be prohibited from transmission to an intended data recipient based on the level of sensitive data leakage attributed to the data set.

In other specific embodiments of the computer-implemented method, scanning further includes scanning the first textual datum extracted from the document data and the second textual datum extracted from the image data to detect ciphertext from amongst a plurality of clear text within the document data and the image data. In other words, the scanning is able to detect isolated incidents of ciphertext embedded amongst otherwise clear/plain text.

In still further specific embodiments of the computer-implemented method, receiving further includes receiving the data sets in unstructured format, and the computer-implemented method further includes normalizing the data sets including reformatting the datasets to a structured format.

In other specific embodiments, the computer-implemented method includes generating a visual indicator disposed within the document data and the image data that indicates locations within a document or an image of (i) the ciphertext, and (ii) the first textual datum and second textual datum classified as private data and confidential data. For example, the ciphertext and datum classified as private or confidential may be encircled within the document or image or otherwise highlighted.

Moreover, in other specific embodiments, the computer-implemented method further includes identifying noisy data in the data set that remains unstructured after normalizing the data set and filtering the noisy data from the data set prior to further processing.

A computer program product including a non-transitory computer-readable medium defines third embodiments of the invention. The non-transitory computer-readable medium includes sets of codes for causing one or more computing devices to receive, from a plurality of data sources, data sets comprising data, which are designated for computing network transmission and segregate the data within the data sets based on data type (e.g., document data and image data). The sets of codes further include a set of codes that cause the computer device(s) to scan first textual datum extracted from the document data and second textual data extracted from the image data to detect ciphertext within the document data and the image data. In addition, the sets of codes further include sets of codes that cause the computing device(s) to implement one or more machine learning models, trained on supervised and unsupervised learning, to analyze the first and second textual datum to determine a data classification (i.e., (i) public data, (ii) private data and (iii) confidential data) for each first and second textual datum within the data and implement one or more deep learning models, which are self-trained, to identify emerging data points that impact data classification and continuously feed the emerging data points to the machine learning models. Moreover, the sets of codes include a set of codes for causing the computing device(s) to analyze the detected ciphertext within the document data and the image data, and outputs from the one or more machine learning models and the one or more deep learning models to determine a level of sensitive data leakage attributed to each data set.

In specific embodiments of the computer program product, the sets of codes further include a set of code for causing the one or more computing device to determine, within real-time of receiving the data set, whether the data set should be prohibited from transmission to an intended data recipient based on the level of sensitive data leakage attributed to the data set.

In additional specific embodiments of the computer program product, the set of code for causing the one or more computing devices to scan are further configured to cause the one or more computing devices to scanning further comprises scanning the first textual datum extracted from the document data and the second textual data extracted from the image data to detect ciphertext from amongst a plurality of clear text within the document data and the image data. In this regard, the invention detects isolated incidents of cyphertext in documents or images that predominately include plain/clear text.

In further specific embodiments of the computer program product, the set of code for causing the one or more computing devices to receive are further configured to cause the one or more computing devices to receive the data sets in unstructured format. In such embodiments of the computer program product, the sets of codes further include a set of codes for causing the one or more computing devices to normalize the data sets including reformatting the datasets to a structured format compatible for further processing.

Moreover, in further specific embodiments of the computer program product, the sets of codes further include a set of code for causing the one or more computing device to generate a visual indicator disposed within the document data and the image data that indicates locations within a document or an image of (i) the ciphertext, and (ii) the first textual datum and second textual datum classified as private data and confidential data.

Thus, as described in detail above, present embodiments of the invention include apparatus, methods, computer program products and/or the like that provide for a comprehensive system for sensitive data leakage protection. The invention provides the ability to scan the text extracted from documents and images to detect isolated incidents of ciphertext within a document or image. Further, the invention implements machine learning to analyze the datum in the datasets (i.e., within a specific data transmission or digital communication) to determine data classifications and deep learning to detect emerging data points (i.e., new threats affecting the ability to classify data) and feeds such emerging data points back to the machine learning model(s). Intelligence capable of receiving findings from the ciphertext detection component as well both the machine learning and the deep learning is executed to determine a level of sensitive data leakage attributed to each dataset being transmitted/communicated and, in response to determining the level of sensitive date leakage, make real-time decisions on whether to allow an ongoing data transmission/digital communication to proceed, hold the data transmission/digital communication for further investigation or block the data transmission/digital communication altogether.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
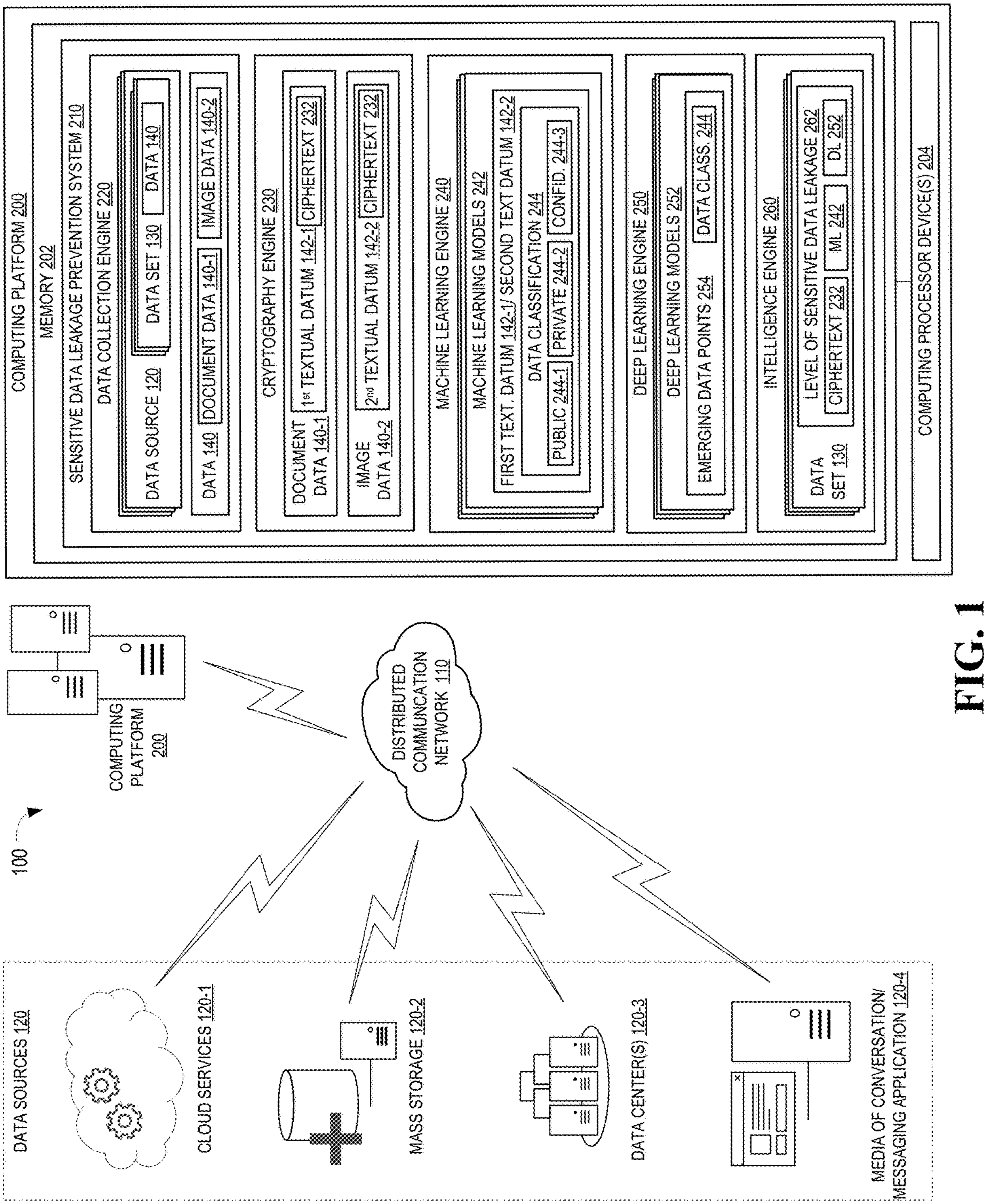
Figure 2A:
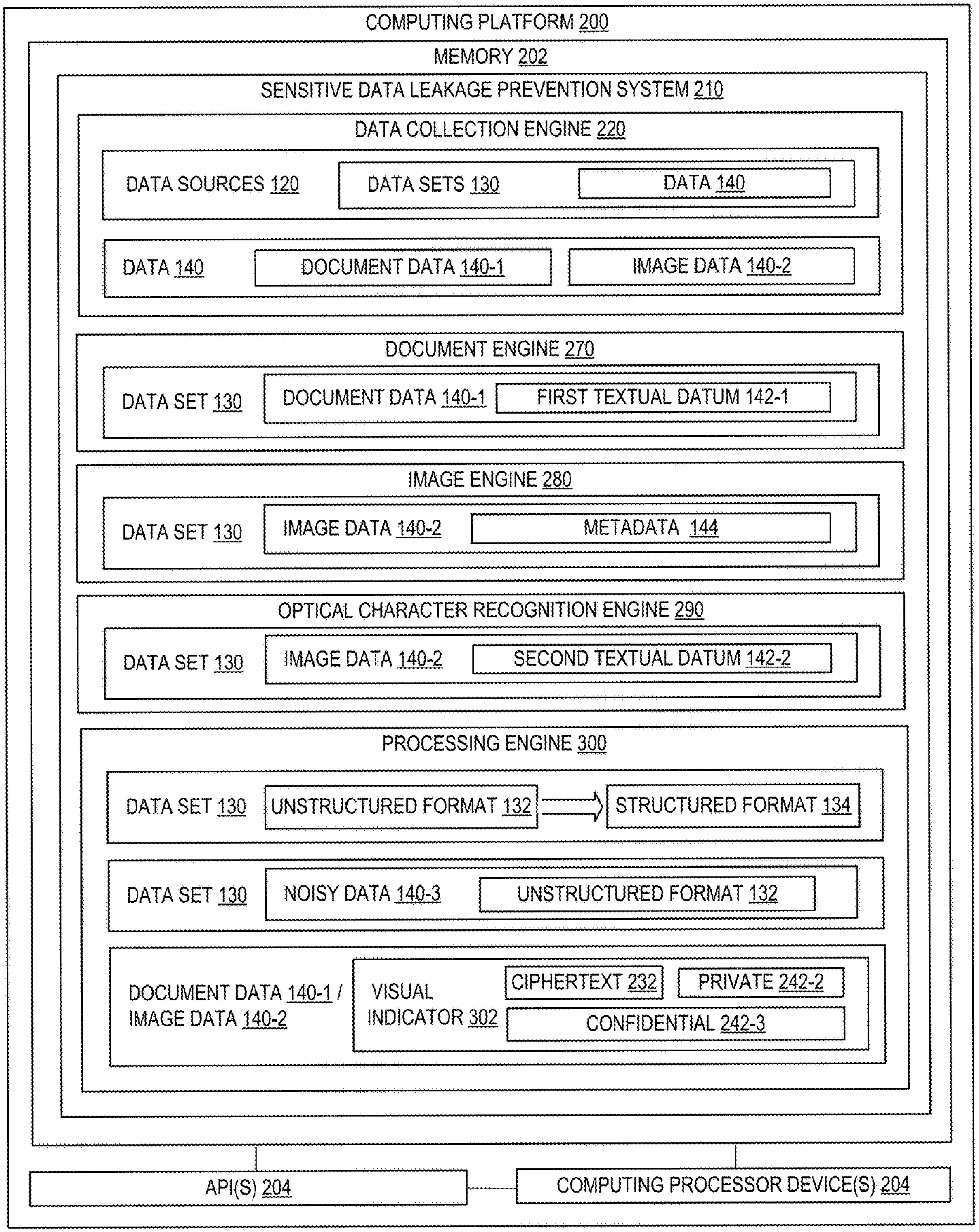
Figure 2B:
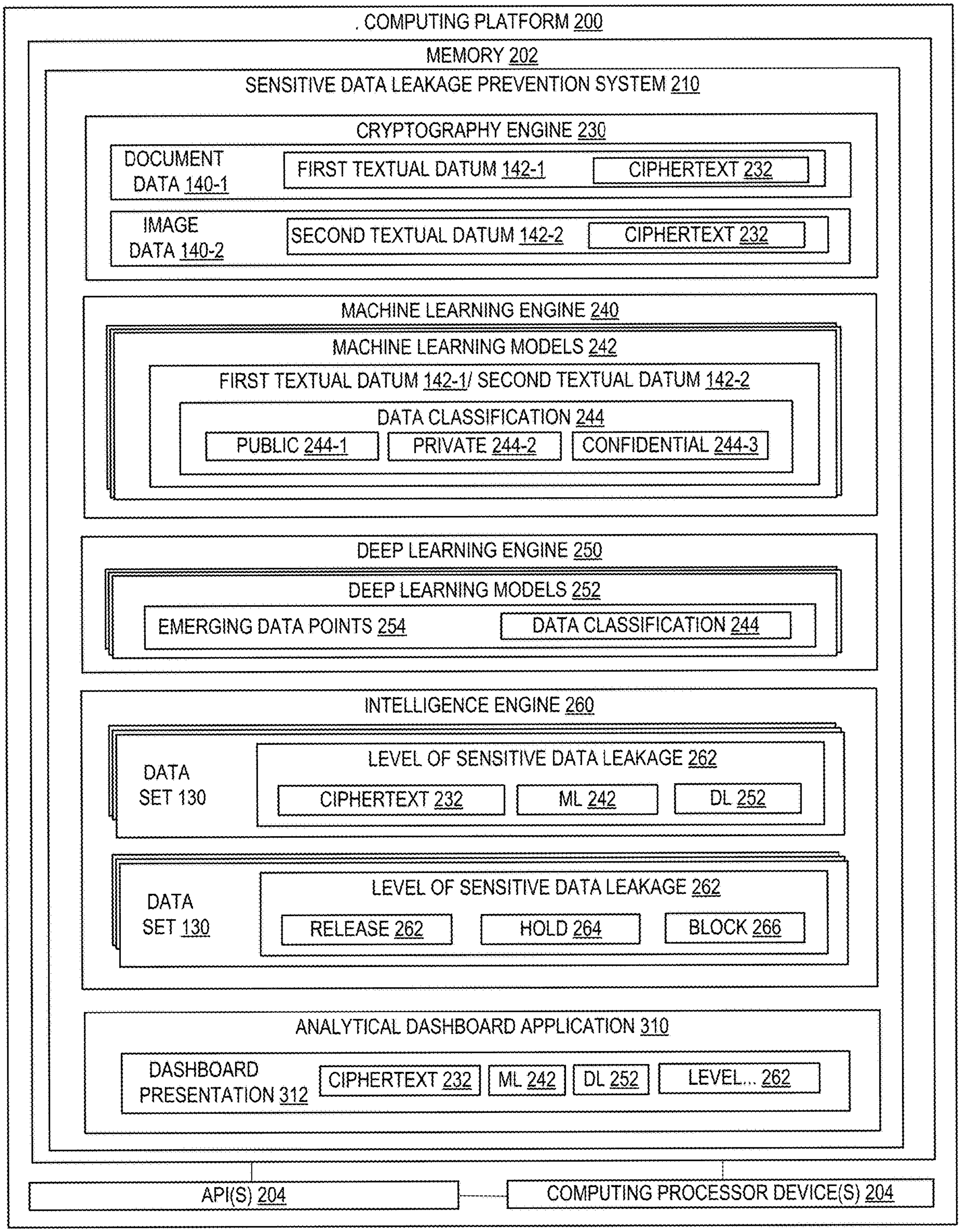
Figure 3:
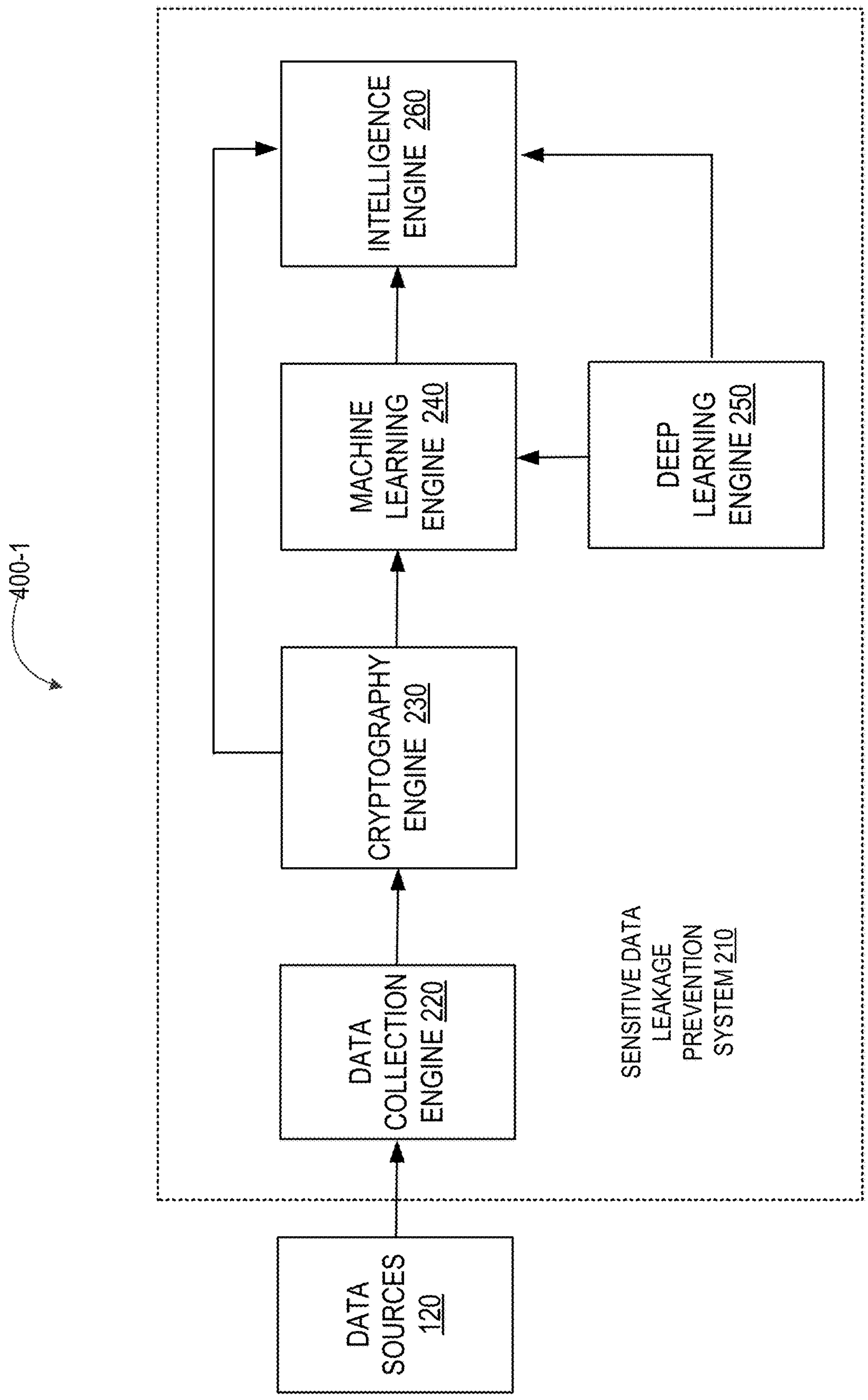
Figure 4:
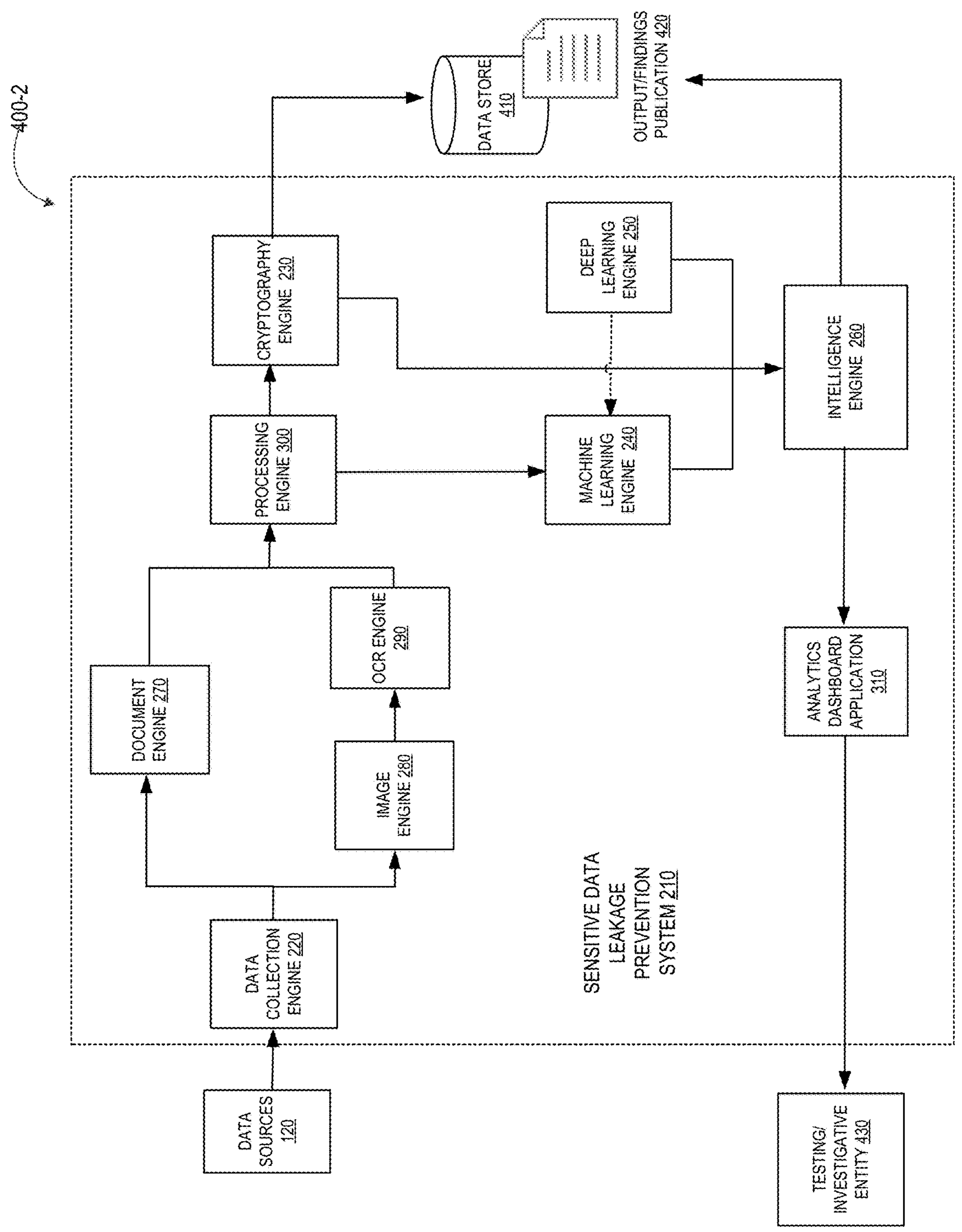
Figure 5:
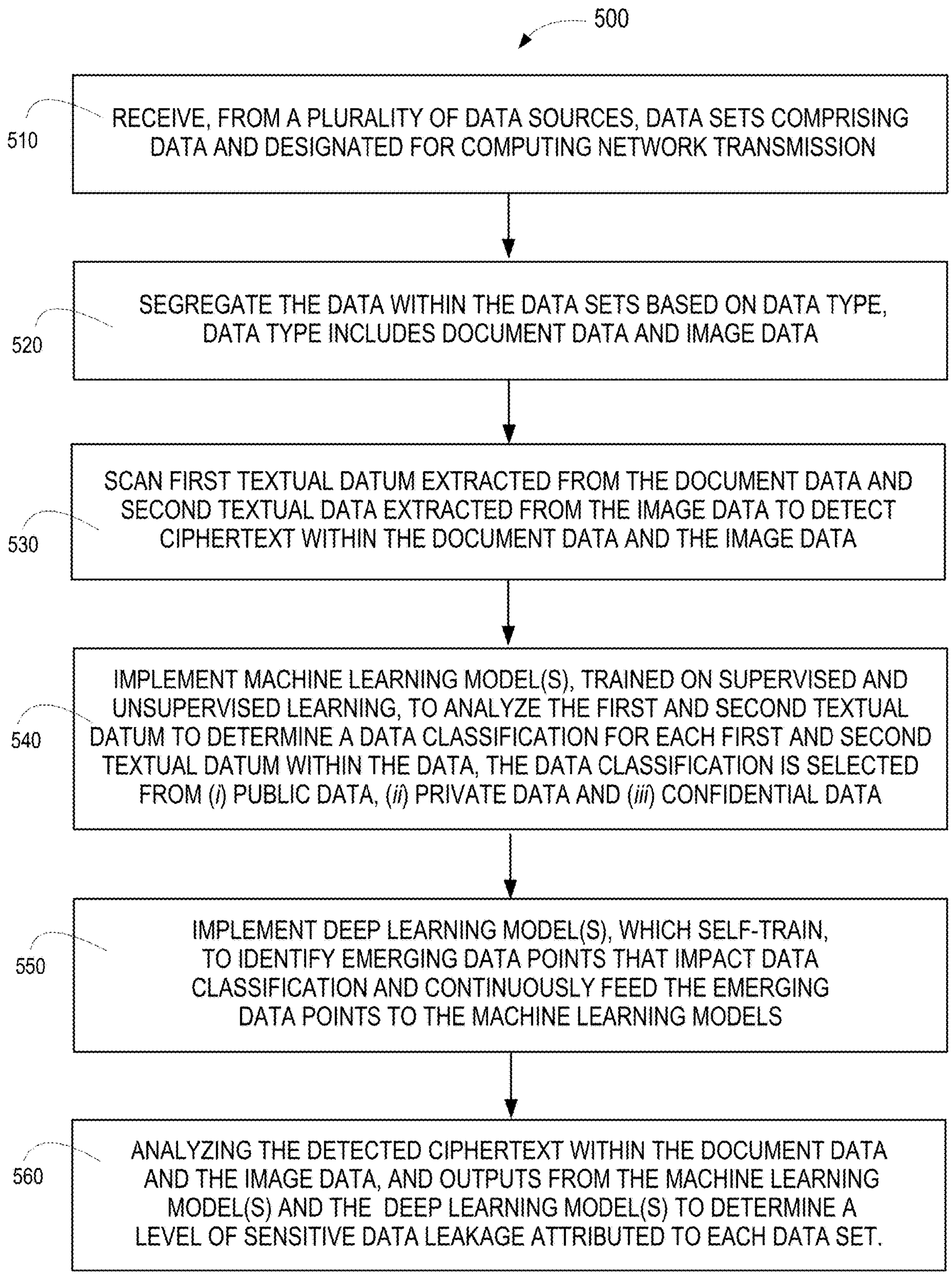
Figure 6:
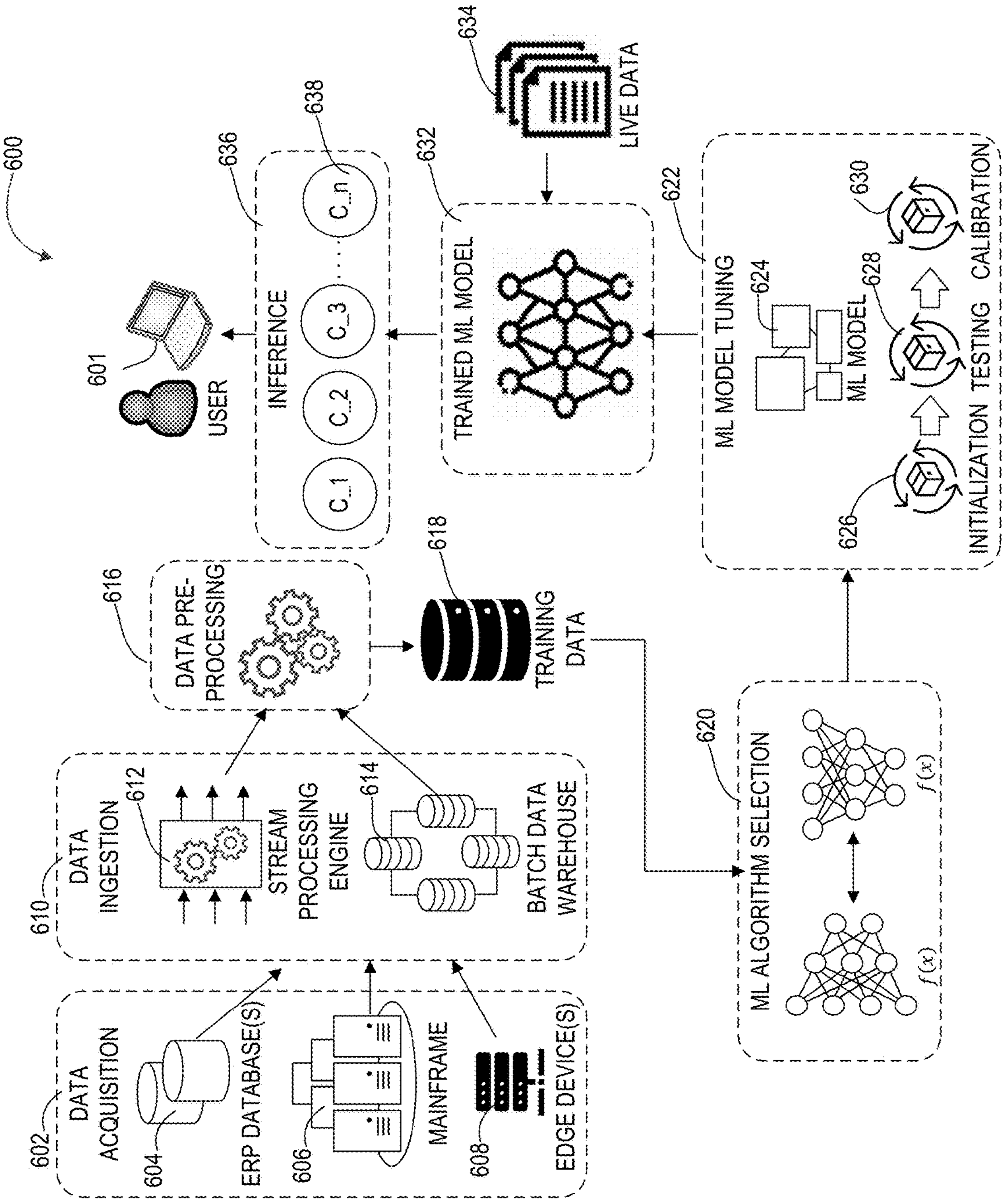

Having thus described embodiments of the disclosure in general terms, reference will now be made to the accompanying drawings, wherein:

FIG. 1 is a schematic of a system for sensitive data leakage prevention, in accordance with embodiments of the present invention;

FIGS. 2A and 2B are block diagrams of a computing platform for sensitive data leakage prevention, in accordance with embodiments of present invention;

FIG. 3 is a flow diagram of a high-level method for sensitive data leakage prevention, in accordance with embodiments of the invention;

FIG. 4 is a flow diagram of a detailed method for sensitive data leakage prevention, in accordance with embodiments of the invention;

FIG. 5 is a flow diagram of a computer-implemented method for sensitive data leakage prevention, in accordance with embodiments of the invention; and FIG. 6 is a schematic diagram of an exemplary machine learning (ML) subsystem architecture, in accordance with embodiments of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product, or a combination of the foregoing. Accordingly, embodiments of the present invention may take the form of an entirely hardware embodiment, an entirely software embodiment (including firmware, resident software, micro-code, a.), or an embodiment combining software and hardware aspects that may be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted, or unscripted programming language such as JAVA, PERL, SMALLTALK, C++, PYTHON, or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

"Computing platform" or "computing device" as used herein refers to a networked computing device within the computing system. The computing platform includes a processor, a non-transitory storage medium (i.e., memory), a communications device, and a display. The computing platform may be configured to support user logins and inputs from any combination of similar or disparate devices. Accordingly, the computing platform includes servers, personal desktop computer, laptop computers, mobile computing devices and the like.

Thus, systems, apparatus, and methods are described in detail below that provide for a comprehensive sensitive data leakage protection. The invention realizes that within a large enterprise data is transmitted/communicated via various channels and, therefore, the invention provides for data being analyzed to originate from various data sources including, but not limited to, cloud storage environments, mass storage devices, data centers and media of conversation/messaging service applications and the like. Such data will be received in raw and unstructured format and, as a result the invention provides for normalizing/structuring the data (i.e., converting the data to a standard format) prior to subsequent processing.

The invention further realizes that data transmissions and/or digital communications will include both document data including spreadsheets and the like, and image data including screenshots and the like. Therefore, the invention provides for implementing image character recognition techniques or the like to detect textual datum in images and convert such images into machine-readable text.

The invention provides the ability to scan the text extracted from the documents and the images to detect ciphertext (i.e., encryption performed at the text level). In this regard, nefarious entities desiring to communicate/transmit sensitive data may seek to avoid detection mechanisms by implementing ciphertext as a means for masking the sensitive data. The invention provides the ability to detect documents/images that include entirely ciphertext as well as isolated incidents (e.g., one or few words or phrases) in a document or image that otherwise comprises plaintext (i.e., human-readable unencrypted text).

The invention implements machine learning and deep learning. Machine learning techniques are implemented, which have been trained on both supervised and unsupervised learning to analyze the datum in the datasets (i.e., within a specific data transmission or digital communication) to determine data classifications. Specifically, to determine whether datum (i.e., words of phrases or the like) should be classified as public, private and/or confidential. Continuous deep learning is implemented, which is self-trained, to detect emerging data points (i.e., new threats affecting the ability to classify data) and feeds such emerging data points back to the machine learning model(s).

Moreover, the invention implements intelligence capable of receiving findings from the ciphertext detection component as well both the machine learning and the deep learning to determine a level of sensitive data leakage attributed to each dataset being transmitted/communicated and, in response to determining the level of sensitive date leakage, make real-time decisions on whether to allow an ongoing data transmission/digital communication to proceed, hold the data transmission/digital communication for further investigation or block the data transmission/digital communication altogether. Additionally, the invention provides for an analytics dashboard that allows investigative entities to view visual data associated with the outcomes of the ciphertext detection, machine learning and deep learning components for purposes of dispositioning data transmissions and digital communications having hold statuses. Moreover, the invention provide for adding visual indicators within documents and images that indicate the location of ciphertext and datum classified as private and/or confidential. The visual indicator may take the form of encircling or otherwise highlighting the ciphertext or private/confidential datum. Such documents and images with visual indicators are presented or otherwise made available for viewing within the analytics dashboard.

Referring to FIG. 1, a schematic is presented of a system 100 for sensitive data leakage prevention, in accordance with embodiments of the present invention. Sensitive data, as used herein may include, but is not limited to, private data and/or confidential data, including personal data including biometric data, financial data, legal data, employment data, intellectual property data and the like. The system 100 includes computing platform 200, which includes a memory 202 and one or more computing processor devices 204 in communication with memory 202. Memory 202 stores sensitive data leakage prevention system 210, which is executable by at least one of the computing processor device(s) 204.

Sensitive data leakage prevention system 210 includes data collection engine 220 that is configured to receive or collect, from a plurality of data sources 120, data sets 130 that include data 140 and are designated for computing network transmission (i.e., either internal, such as intranet or external, such as Internet network communication). According to specific embodiments of the system 100, data sources 120, as shown in FIG. 1 include, but are not necessarily limited to, cloud services 120-1, mass storage 120-2, data centers 120-3, and media of conversation (MOC)/messaging service application 120-4 and the like. The data set 130 may be a large data file comprising a large volume of data 140 or a single electronic communication, such as an electronic mail (i.e., email) or electronic message (i.e., Short Message Service (SMS) message or the like). Designated for computing network transmission means that the data sets 130 have been requested for communication over a computing network in the near term or that communication over the computing network has been initiated (e.g., a user has activated a send key or the like). In this regard, in specific embodiments of the invention, system 100 acts as a gateway, in that, as will be discussed in detail infra., data sets 130 may be placed on hold or, in specific instances blocked, from being communicated to one or more addressees/data recipients based on identified sensitive data.

Further, data collection engine 210 is configured to segregate the data 140 according to data type, which, in specific embodiments, includes document data 140-1 (e.g., email, message, text file, spreadsheet or the like) and image data 140-2 (e.g., screenshots or the like).

Sensitive data leakage prevention system 210 further includes cryptography engine 230, which is configured to scan (i) first textual datum 142-1 extracted from the document data 140-1 and (ii) second textual data 142-2 extracted from the image data 140-2 to detect ciphertext 232 within the document data 140-1 and the image data 140-2. Ciphertext 232 are individual words, phrases, numerals, or alphanumeric entries that have been encrypted (e.g., jumbled/reordered text, additional characters or the like). In specific embodiments of the invention, cryptography engine 230 is configured to detect (i) isolated instances of ciphertext 232 throughout textual data extracted from a document or image that is predominately plain/clear text and/or (ii) complete (100%) or near complete (close to 100%) ciphertext within textual data extracted from a document or image.

Further, sensitive data leakage prevention system 210 further includes machine learning engine 240, which includes one or more machine learning (ML) models 242, which have been trained on supervised and unsupervised learning. ML model(s) 242 are configured to analyze the first and second textual datum 142-1 and 142-2 to determine a data classification 244 for each first and second textual datum 142-1 and 142-2 within the data 140 of a data set 140. According to specific embodiments of the invention, data classification 244 includes (i) public data 244-1, (ii) private data 244-2 and (iii) confidential data 244-3.

Additionally, sensitive data leakage prevention system 210 further includes deep learning engine 250, which includes one or more deep learning (DL) models 252, which are self-trained. DL model(s) 252 are configured to identify emerging data points 254 (i.e., emerging sensitive data threats) that impact data classification 244 and continuously feed the emerging data points 254 to the ML model(s) 242. Thus, ensuring that the ML model(s) 242 are adapt at identifying new/emerging data points/threats that impact data classification 244.

Moreover, sensitive data leakage prevention system 210 further includes intelligence engine 260 that is configured to receive outputs from (i) the cryptography engine 230 including detected ciphertext 232 within the document data 140-1 and the image data 140-2, (ii) the machine learning engine 240 and (iii) the deep learning engine 250 and analyze the outputs to determine a level of sensitive data leakage 262 attributed to each data set 130. In specific embodiments of the system 100 (not shown in FIG. 1), intelligence engine 260 is further configured to determine, within real-time of the data collection engine 220 receiving the data set 130, whether the data set 130 should be prohibited from further transmission (e.g., placed in a hold queue or blocked) to an intended data recipient based on the level of sensitive data leakage 262 attributed to the data set 130.

Referring to FIGS. 2A and 2B, block diagrams are depicted of computing platform 200 highlighting various alternate embodiments of the apparatus, in accordance with embodiments of the present invention. Computing platform 200 may comprise one or multiple computing devices, such as application servers, gateway devices or the like. As previously discussed in relation to FIG. 1, computing platform 200 includes memory 202, which may comprise volatile and/or non-volatile memory, such as read-only memory (ROM) and/or random-access memory (RAM), EPROM, EEPROM, flash cards, or any memory common to computing platforms. Moreover, memory 202 may comprise cloud storage, such as provided by a cloud storage service and/or a cloud connection service.

Further, computing platform 200 includes one or more computing processor devices 204, which may be an application-specific integrated circuit ("ASIC"), or other chipset, logic circuit, or other data processing device. Computing processor device(s) 204 may execute one or more application programming interface (APIs) 206 that interface with any resident programs, such as sensitive data leakage prevention system 210 or the like, stored in memory 202 of computing platform 200 and any external programs. Computing platform 200 includes various processing sub-systems (not shown in FIG. 2) embodied in hardware, firmware, software, and combinations thereof, that enable the functionality of computing platform 200 and the operability of computing platform 200 on a distributed communication network, such as distributed communication network 110 shown in FIG. 1. For example, processing sub-systems allow for initiating and maintaining communications and exchanging data with other networked devices. For the disclosed aspects, processing sub-systems of computing platform 200 includes any processing sub-system portion used in conjunction with sensitive data leakage prevention system 210 and engines, tools, routines, sub-routines, applications, sub-applications, sub-modules thereof.

In specific embodiments of the present invention, computing platform 200 additionally includes a communications module (not shown in FIG. 2) embodied in hardware, firmware, software, and combinations thereof, that enables electronic communications between components of computing platform 200 and other networks and network devices, such as data sources 120 shown in FIG. 1. Thus, communication module includes the requisite hardware, firmware, software and/or combinations thereof for establishing and maintaining a network communication connection with one or more devices and/or networks.

As previously discussed in relation to FIG. 1, memory 202 stores sensitive data leakage prevention system 210 that is executable by one or more of the computing processor device(s) 204.

Sensitive data leakage prevention system 210 includes data collection engine 220 that is configured to receive or collect, from a plurality of data sources 120, data sets 130 that include data 140 and are designated for computing network transmission (i.e., either internal, such as intranet or external, such as Internet network communication). According to specific embodiments of the system 100, data sources 120, as shown in FIG. 1 include, but are not necessarily limited to, cloud services 120-1, mass storage 120-2, data centers 120-3, and media of conversation (MOC)/messaging service application 120-4 and the like. The data set 130 may be a large data file comprising a large volume of data 140 or a single electronic communication, such as an electronic mail (i.e., email) or electronic message (i.e., Short Message Service (SMS) message or the like). Designated for computing network transmission means that the data sets 130 have been requested for communication over a computing network in the near term or that communication over the computing network has been initiated (e.g., a user has activated a send key or the like). In this regard, in specific embodiments of the invention, system 100 acts as a gateway, in that, as will be discussed in detail infra., data sets 130 may be placed on hold or, in specific instances blocked, from being communicated to one or more addressees/data recipients based on identified sensitive data.

Further, data collection engine 210 is configured to segregate the data 140 according to data type, which, in specific embodiments, includes document data 140-1 (e.g., email, message, text file, spreadsheet or the like) and image data 140-2 (e.g., screenshots or the like).

In specific embodiments of the system 100, sensitive data leakage prevention system 210 includes document engine 270 that is configured to receive the segregated document data 140-1 from the data collection engine 220 and extract the first textual datum 142-1 from the document data (e.g., WORD documents, Portable Document Format (PDF) documents and the like). In addition, sensitive data leakage prevention system 210 includes image engine 280 that is configured to receive the segregated image data 140-2 from the data collection engine 220 and analyze the image metadata 144 for purposes of subsequent textual datum 142-2 extraction. As such, sensitive data leakage prevention system 210 includes optical character recognition (OCR) engine 280, which is configured to extract the second textual datum 142-2 from the image data 140-2.

In other specific embodiments of the system 100, sensitive data leakage prevention system 210 includes processing engine 300, which is configured to receive the data sets 130 (or the document data 140-1 and image data 140-2) in unstructured format 132 and normalize the data sets 130 (or the document data 140-1 and image data 140-2) including reformatting the datasets to a structured format 134 ingestible by the cryptography engine 230 and the machine learning engine 240. In related embodiments of the system 100, processing engine 300 is configured to identify noisy data 140-3 in the data set 130 that remains in the unstructured format 132 after normalizing the data set, and filter the noisy data 140-3 from the data set 130 prior to processing by the cryptography engine 230, the machine learning engine 240 and the like.

In further embodiments of the system 100, processing engine 100 is further configured to receive detected ciphertext 232 from the cryptography engine 230 and textual datum classified as private 242-2 and confidential 242-3 along with the location of the ciphertext 232 and private 242-2/confidential 24-3 classified textual datum within document data 140-1 and/or image data 140-2 and, in response, implement the OCR engine, such as GOOGLE TESSERACT® or the like to generate a visual indicator 302 disposed within the document 140-1 or the image 140-2 that indicates the location within the document 140-1 or the image 140-2 of (i) the ciphertext 232, and (ii) the first textual datum 142-1 and second textual datum 142-2 classified as private data 242-2 and confidential data 242-3. In specific embodiments of the invention, the visual indicator 302 may encircle or otherwise highlight (e.g., color coding) the i) the ciphertext 232, and (ii) the first textual datum 142-1 and second textual datum 142-2 classified as private data 242-2 and confidential data 242-3.

Referring to FIG. 2B, as described in relation to FIG. 1, sensitive data leakage prevention system 210 further includes cryptography engine 230, which is configured to scan (i) first textual datum 142-1 extracted from the document data 140-1 and (ii) second textual data 142-2 extracted from the image data 140-2 to detect ciphertext 232 within the document data 140-1 and the image data 140-2. Ciphertext 232 are individual words, phrases, numerals, or alphanumeric entries that have been encrypted (e.g., jumbled/reordered text, additional characters or the like). In specific embodiments of the invention, cryptography engine 230 is configured to detect (i) isolated instances of ciphertext 232 throughout textual data extracted from a document or image that is predominately plain/clear text and/or (ii) complete (100%) or near complete (close to 100%) ciphertext within textual data extracted from a document or image.

Further, sensitive data leakage prevention system 210 further includes machine learning engine 240, which includes one or more machine learning (ML) models 242, which have been trained on supervised and unsupervised learning. ML model(s) 242 are configured to analyze the first and second textual datum 142-1 and 142-2 to determine a data classification 244 for each first and second textual datum 142-1 and 142-2 within the data 140 of a data set 140. According to specific embodiments of the invention, data classification 244 includes (i) public data 244-1, (ii) private data 244-2 and (iii) confidential data 244-3. Additionally, sensitive data leakage prevention system 210 further includes deep learning engine 250, which includes one or more deep learning (DL) models 252, which are self-trained. DL model(s) 252 are configured to identify emerging data points 254 (i.e., emerging sensitive data threats) that impact data classification 244 and continuously feed the emerging data points 254 to the ML model(s) 242. Thus, ensuring that the ML model(s) 242 are adapt at identifying new/emerging data points/threats that impact data classification 244.

In addition, sensitive data leakage prevention system 210 further includes intelligence engine 260 that is configured to receive outputs from (i) the cryptography engine 230 including detected ciphertext 232 within the document data 140-1 and the image data 140-2, (ii) the machine learning engine 240 and (iii) the deep learning engine 250 and analyze the outputs to determine a level of sensitive data leakage 262 attributed to each data set 130. In specific embodiments of the system 100, intelligence engine 260 is further configured to determine, within real-time of the data collection engine 220 receiving the data set 130, whether the data set 130 should be prohibited from further transmission (e.g., placed in a hold 264 queue or blocked 266) to intended data recipient(s) or released 262 for transmission/communication to the intended data recipient(s) based, at least, on the level of sensitive data leakage 262 attributed to the data set 130.

Moreover, in additional specific embodiments of the system 100, sensitive data leakage prevention system 210 further includes an analytic dashboard application 310 in communication with the intelligence engine 260 and configured to present dashboard presentation 312, to an investigative entity, that includes the outputs from (i) the cryptography engine 230 including detected ciphertext 232 within the document data 140-1 and the image data 140-2, (ii) the machine learning engine 240 and (iii) the deep learning engine 252 and the level of sensitive data leakage 262 attributed to each data set 130.

Referring to FIG. 3, a flow diagram is presented of a method 400-1 for sensitive data leakage prevention, in accordance with embodiments of the present invention. Data collection engine 220 of sensitive data leakage prevention system 210 receives data sets destined for electronic data communication/transmission from data sources 120. As previously discussed, data sources 120 may include, but are not limited to, cloud services, mass storage, data centers, and media of conversation (MOC)/messaging service application and the like. Once received, the data within the data sets are segregated by the data collection engine 220 based on data type, specifically, document data and image data.

Subsequently, textual datum is extracted from both the document data and the image data and communicated to the cryptography engine 230, which scans the textual datum to detect any occurrences of ciphertext within the document data and image data. As previously discussed, ciphertext is text (e.g., words, phrases, numerals, alphanumeric entries or the like) that is encrypted (e.g., jumbled/re-arranged, added characters, or the like). Subsequently, the textual datum is communicated to the machine learning engine 240 which includes ML model(s) trained to determine data classifications for each textual datum (i.e., each word, phrase, numeral, alphanumeric entry and the like) within a data set. The data classifications include, but are not limited to, (i) public data, (ii) private data and (iii) confidential data. Moreover, deep learning engine 250 implements one or more DL models that are self-trained and configured to identify emerging threats/data points, which as they are identified are fed back to the ML models to hone the determination of data classifications.

Further outputs from the cryptography engine 220, the ML engine 240 and the DL engine 250 are communicated to the intelligence engine 260, which determines a level of potential sensitive data leakage attributed to the ciphertext, and private/confidential data in the data set (i.e., in document(s) and/or image(s) comprising the data set). Moreover, in specific embodiments of the method 400-1, intelligence engine 260 dispositions the data set (i.e., determines whether to release, hold or block the data set for data transmission/communication based, at least of the level of potential sensitive data leakage.

Referring to FIG. 4, a flow diagram is presented of a detailed method 400-2 for sensitive data leakage prevention, in accordance with embodiments of the present invention. Data collection engine 220 of sensitive data leakage prevention system 210 receives data sets destined for electronic data communication/transmission from data sources 120. Once received, the data within the data sets are segregated by the data collection engine 220 based on data type, specifically, document data and image data. The segregated document data is communicated to document engine 270 to extract the textual datum from the document data (e.g., WORD documents, Portable Document Format (PDF) documents and the like). The segregated image data is communicated to an image engine 280 that analyzes the image metadata for purposes of subsequent textual datum extraction, which is performed at OCR engine 290, such as GOOGLE TESSERACT® or the like.

The extracted textual datum is communicated from the document engine 270 and the OCR engine 290 to the processing engine 300, which normalizes/re-formats the data from the raw unstructured format in which the data sets were received to a structured format that is ingestible by the cryptography engine 230 and the machine learning engine 240. Additionally, the processing engine 300 identifies noisy data in the data set that remains in the unstructured format after normalizing the data set and filters the noisy data from the data set prior to processing by the cryptography engine 230 and the machine learning engine 240.

Subsequently, textual datum is communicated from the processing engine 290 to the cryptography engine 230, which scans the textual datum to detect any occurrences of ciphertext within the document data and image data. As previously discussed, ciphertext is text (e.g., words, phrases, numerals, alphanumeric entries or the like) that is encrypted (e.g., jumbled/re-arranged, added characters, or the like). The textual datum is also communicated from the processing engine 290 to the machine learning engine 240 which includes ML model(s) trained (supervised and unsupervised) to determine data classifications for each textual datum (i.e., each word, phrase, numeral, alphanumeric entry and the like) within a data set. The data classifications include, but are not limited to, (i) public data, (ii) private data and (iii) confidential data. Moreover, deep learning engine 250 implements one or more DL models that are self-trained and configured to identify emerging threats/data points, which as they are identified are fed back to the ML models to hone the determination of data classifications.

Further, outputs from the cryptography engine 220, the ML engine 240 and the DL engine 250 are communicated to the intelligence engine 260, which determines a level of potential sensitive data leakage attributed to the ciphertext, and private/confidential data in the data set (i.e., in document(s) and/or image(s) comprising the data set). Moreover, in specific embodiments of the method 400-1, intelligence engine 260 dispositions the data set (i.e., determines whether to release, hold or block the data set for data transmission/communication based, at least of the level of potential sensitive data leakage.

The outputs from the cryptography engine 230 and the intelligence engine 260 are stored in data store 410, as well as, published via publication 420 to support teams and the like. In addition, analytic dashboard application 310 receives outputs from intelligence engine, and presents a dashboard presentation, to a testing/investigative entity 430, that includes the outputs from (i) the cryptography engine 230 including detected ciphertext (ii) the machine learning engine 240 and (iii) the deep learning engine 250.

Referring to FIG. 5, a flow diagram is a depicted of a computer-implemented method 500 for sensitive data leakage prevention, in accordance with embodiments of the present invention. At Event 510, data sets are received or otherwise collected from a plurality of data sources. The data sets include data and are designated for computing network transmission (i.e., either internal, such as intranet or external, such as Internet network communication). According to specific embodiments of the method 500, the data sources from which the datasets are received include, but are not necessarily limited to, cloud services, mass storage, data centers, and media of conversation (MOC)/messaging service application and the like. The data set may be a large data file comprising a large volume of data or a single electronic communication, such as an electronic mail (i.e., email) or electronic message (i.e., Short Message Service (SMS) message or the like). In response to receiving the data sets, at Event 420, the data in the data sets is segregated based on data type, specifically, the data is segregated as either document data or image data. In specific embodiments of the method 500, not shown in FIG. 5, the textual datum included in the document and image data is extracted.

At Event 530, the textual datum extracted from the document and image data is scanned to detect any instances of ciphertext within the image or document data. As previously noted, ciphertext is encryption applied to specific text (words, phrases, numerals, alphanumeric entries and the like) within a document or image. The method is capable of detecting a single instance of ciphertext within a document or image or a document or image comprised entirely of ciphertext.

At Event 540, machine learning model(s) trained on supervised and unsupervised learning are implemented to analyze the textual datum in the document and image data to determine a data classification for each textual datum. The data classification may include (i) public data, (ii) private data and (iii) confidential data. Further, at Event 550, deep learning model(s) that are self-trained are implemented to identify emerging data points/threats that impact data classification and continuously feed the emerging data points to the machine learning models as part of the unsupervised learning.

At Event 550, the detected ciphertext within the document and image data and the outputs from the machine learning and deep learning models are analyzed to determine a level of sensitive data leakage attributed to each data set. The level may be based on amounts of sensitive data, with the type of sensitive data (e.g., ciphertext, private data and confidential) taking into account (e.g., weighted based on data type) as well as the type and size of the data set. In response to determining the level of sensitive data leakage decisions are made to release, hold, or block the data set based, at least on the determined level of sensitive data leakage attributed to a corresponding data set.

FIG. 6 illustrates an exemplary machine learning (ML) subsystem architecture 600, in accordance with an embodiment of the invention. The machine learning subsystem 600 includes a data acquisition engine 602, data ingestion engine 610, data pre-processing engine 616, ML model tuning engine 622, and inference engine 636.

The data acquisition engine 602 identifies various internal and/or external data sources to generate, test, and/or integrate new features for training the machine learning model 624. These internal and/or external data sources 604, 606, and 608 may be initial locations where the data originates or where physical information is first digitized. The data acquisition engine 602 identifies the location of the data and describes connection characteristics for access and retrieval of data. In some embodiments, data is transported from each data source 604, 606, or 608 using any applicable network protocols, such as the File Transfer Protocol (FTP), HyperText Transfer Protocol (HTTP), or any of the myriad Application Programming Interfaces (APIs) provided by websites, networked applications, and other services. In some embodiments, these data sources include Enterprise Resource Planning (ERP) database(s) 604 that host data related to day-to-day business activities such as accounting, procurement, project management, exposure management, supply chain operations, and/or the like, mainframe 606 that is often the entity's central data processing center, edge device(s) 608 that may be any piece of hardware, such as sensors, actuators, gadgets, appliances, or machines, that are programmed for certain applications and can transmit data over the internet or other networks, and/or the like. The data acquired by the data acquisition engine 602 from these data sources 604, 606, and 608 is transported to the data ingestion engine 610 for further processing.

Depending on the nature of the data imported from the data acquisition engine 602, the data ingestion engine 610 may move the data to a destination for storage or further analysis. Typically, the data imported from the data acquisition engine 602 is in varying formats as the data comes from different sources, including Rational Database Management Systems (RDBMs), other types of databases, Simple Storage Service (S3) buckets, Commas-Separated Value (CSVs), or from streams. Since the data comes from different entities, the data needs to be cleansed and transformed so that it can be analyzed together with data from other sources. At the data ingestion engine 610, the data may be ingested in real-time, using the stream processing engine 612, in batches using the batch data warehouse 614, or a combination of both. The stream processing engine 612 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 614 collects and transfers data in batches according to scheduled intervals, trigger events, or any other logical ordering.

In machine learning, the quality of data and the useful information that can be derived therefrom directly affects the ability of the machine learning model 624 to learn. The data pre-processing engine 616 implements advanced integration and processing steps needed to prepare the data for machine learning execution. This includes modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 616 implements feature extraction and/or selection techniques to generate training data 618. Feature extraction and/or selection is a process of dimensionality reduction by which an initial set of data is reduced to more manageable groups for processing. A characteristic of these large data sets is a large number of variables that require sizeable computing resources to process. Feature extraction and/or selection may be used to select and/or combine variables into features, effectively reducing the amount of data that must be processed, while still accurately and completely describing the original data set. Depending on the type of machine learning algorithm being used, training data 618 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 622 may be used to train a machine learning model 624 using the training data 618 to make predictions or decisions without explicitly being programmed to do so. The machine learning model 624 represents what was learned by the selected machine learning algorithm 620 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, or the like), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, or the like), an instance-based method (e.g., k-nearest neighbor, learning vector quantization, self-organizing map, or the like), a regularization method (e.g., ridge regression, least absolute shrinkage and selection operator, elastic net, or the like), a decision tree learning method (e.g., classification and regression tree, iterative dichotomiser 3, C4.5, chi-squared automatic interaction detection, decision stump, random forest, multivariate adaptive regression splines, gradient boosting machines, or the like), a Bayesian method (e.g., naïve Bayes, averaged one-dependence estimators, Bayesian belief network, or the like), a kernel method (e.g., a support vector machine, a radial basis function, or the like), a clustering method (e.g., k-means clustering, expectation maximization, or the like), an associated rule learning algorithm (e.g., an Apriori algorithm, an Eclat algorithm, or the like), an artificial neural network model (e.g., a Perceptron method, a back-propagation method, a Hopfield network method, a self-organizing map method, a learning vector quantization method, or the like), a deep learning algorithm (e.g., a restricted Boltzmann machine, a deep belief network method, a convolution network method, a stacked auto-encoder method, or the like), a dimensionality reduction method (e.g., principal component analysis, partial least squares regression, Sammon mapping, multidimensional scaling, projection pursuit, or the like), an ensemble method (e.g., boosting, bootstrapped aggregation, AdaBoost, stacked generalization, gradient boosting machine method, random forest method, or the like), and/or the like.

To tune the machine learning model, the ML model tuning engine 622 repeatedly executes cycles of initialization/experimentation 626, testing 628, and tuning 630 to optimize the performance of the machine learning model 624 and refine the results in preparation for deployment of those results for consumption or decision making. To this end, the ML model tuning engine 622 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 618. A fully trained machine learning model 632 is one whose hyperparameters are tuned and model accuracy maximized.

The trained machine learning model 632, similar to any other software application output, can be persisted to storage, file, memory, or application, or looped back into the processing component to be reprocessed. More often, the trained machine learning model 632 is deployed into an existing production environment to make practical decisions based on live data 634 (such as, in accordance with the present invention, signals from beacons, data derived from beacon signals, movement/route maps and the like). To this end, the machine learning subsystem 600 uses the inference engine 636 to make such decisions. The type of decision-making may depend upon the type of machine learning algorithm used. For example, machine learning models trained using supervised learning algorithms may be used to structure computations in terms of categorized outputs (e.g., C_1, C_2 . . . C_*n* 638) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., C_1, C_2 . . . C_*n* 638) live data 634 based on how similar they are to one another to solve exploratory challenges where little is known about the data, provide a description or label (e.g., C_1, C_2 . . . C_*n* 638) to live data 634, such as in classification, and/or the like. These categorized outputs, groups (clusters), or labels are then presented to the user input system 601. In still other cases, machine learning models that perform regression techniques may use live data 634 to predict or forecast continuous outcomes.

It will be understood that the embodiment of the machine learning subsystem 600 illustrated in FIG. 6 is exemplary and that other embodiments may vary. As another example, in some embodiments, the machine learning subsystem 600 includes more, fewer, or different components.

Thus, as described in detail above, present embodiments of the invention include systems, methods, computer program products and/or the like that for a comprehensive system for sensitive data leakage protection. The invention provides the ability to scan the text extracted from documents and images to detect isolated incidents of ciphertext within a document or image. Further, the invention implements machine learning to analyze the datum in the datasets (i.e., within a specific data transmission or digital communication) to determine data classifications and deep learning to detect emerging data points (i.e., new threats affecting the ability to classify data) and feeds such emerging data points back to the machine learning model(s). Intelligence capable of receiving findings from the ciphertext detection component as well both the machine learning and the deep learning is executed to determine a level of sensitive data leakage attributed to each dataset being transmitted/communicated and, in response to determining the level of sensitive date leakage, make real-time decisions on whether to allow an ongoing data transmission/digital communication to proceed, hold the data transmission/digital communication for further investigation or block the data transmission/digital communication altogether.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for sensitive data leakage prevention, the system comprising:

a computing platform including a memory and at least one computing processor device in communication with the memory, wherein the memory stores a sensitive data leakage prevention system program code that is executable by one or more of the at least one computing processor devices to:

receive, from a plurality of data sources, data sets comprising data and designated for computing network transmission;

segregate the data within the data sets based on data type, wherein data type includes document data and image data;

scan first textual datum extracted from the document data and second textual data extracted from the image data to detect ciphertext within the document data and the image data, wherein scanning further comprises scanning the first textual datum extracted from the document data and the second textual datum extracted from the image data to detect ciphertext from amongst a plurality of clear text within the document data and the image data;

implement one or more machine learning models, trained on supervised and unsupervised learning, to analyze the first and second textual datum to determine a data classification for each first and second textual datum within the data, wherein the data classification is selected from a group consisting of (i) public data, (ii) private data and (iii) confidential data;

implement one or more deep learning models, which self-train, to identify emerging data points that impact data classification and continuously feed the emerging data points to the machine learning models; and analyze the detected ciphertext within the document data and the image data, and outputs from the one or more machine learning models and the one or more deep learning models to determine a level of sensitive data leakage attributed to each data set.

2. The system of claim 1, further comprising: determining, within real-time of the data collection engine receiving the data set, whether the data set should be prohibited from transmission to an intended data recipient based on the level of sensitive data leakage attributed to the data set.

3. The system of claim 1, wherein receiving, from a plurality of data sources data sets comprising data and designated for computing network transmission further comprises, receiving the data sets in unstructured format and normalize the data sets including reformatting the datasets to a structured format.

4. The system of claim 3, further comprising:

receiving detected ciphertext within the document data and the image data and textual datum and extracted textual datum classified as private data and confidential data, and generating a visual indicator disposed within the document data and the image data that indicates locations within a document or an image of (i) the ciphertext, and (ii) the first textual datum and second textual datum classified as private data and confidential data.

5. The system of claim 3, further comprising:

identifying noisy data in the data set that remains unstructured after normalizing the data set, and filtering the noisy data from the data set.

6. The system of claim 1, wherein receiving, from a plurality of data sources data sets comprising data and designated for computing network transmission further comprises, receiving, from a plurality of data sources, the data sets, wherein the plurality of data sources include (i) one or more cloud storages, (ii) one or more data centers, (iii) one or more mass storage devices and (iv) one or more messaging service applications.

7. A computer-implemented method for sensitive data leakage prevention, the computer-implemented method executed by one or more computing processor device and comprising:

receiving, from a plurality of data sources, data sets comprising data and designated for computing network transmission;

segregating the data within the data sets based on data type, wherein data type includes document data and image data;

scanning first textual datum extracted from the document data and second textual data extracted from the image data to detect ciphertext within the document data and the image data, wherein scanning further comprises scanning the first textual datum extracted from the document data and the second textual datum extracted from the image data to detect ciphertext from amongst a plurality of clear text within the document data and the image data;

implementing one or more machine learning models, trained on supervised and unsupervised learning, to analyze the first and second textual datum to determine a data classification for each first and second textual datum within the data, wherein the data classification is selected from a group consisting of (i) public data, (ii) private data and (iii) confidential data;

implementing one or more deep learning models, which self-train, to identify emerging data points that impact data classification and continuously feed the emerging data points to the machine learning models; and analyzing the detected ciphertext within the document data and the image data, and outputs from the one or more machine learning models and the one or more deep learning models to determine a level of sensitive data leakage attributed to each data set.

8. The computer-implemented method of claim 7, further comprising:

determining, within real-time of receiving the data set, whether the data set should be prohibited from transmission to an intended data recipient based on the level of sensitive data leakage attributed to the data set.

9. The computer-implemented method of claim 7, wherein receiving further comprises receiving the data sets in unstructured format, and wherein the computer-implemented method further comprises normalizing the data sets including reformatting the datasets to a structured format.

10. The computer-implemented method of claim 7, further comprising:

generating a visual indicator disposed within the document data and the image data that indicates locations within a document or an image of (i) the ciphertext, and (ii) the first textual datum and second textual datum classified as private data and confidential data.

11. The computer-implemented method of claim 7, further comprising:

identifying noisy data in the data set that remains unstructured after normalizing the data set; and filtering the noisy data from the data set prior to further processing.

12. A computer program product including a non-transitory computer-readable medium, the non-transitory computer-readable medium comprising sets of codes for causing one or more computing devices to:

receive, from a plurality of data sources, data sets comprising data, which are designated for computing network transmission;

segregate the data within the data sets based on data type, wherein data type includes document data and image data;

scan first textual datum extracted from the document data and second textual data extracted from the image data to detect ciphertext within the document data and the image data, wherein scanning further comprises scanning the first textual datum extracted from the document data and the second textual datum extracted from the image data to detect ciphertext from amongst a plurality of clear text within the document data and the image data;

implement one or more machine learning models, trained on supervised and unsupervised learning, to analyze the first and second textual datum to determine a data classification for each first and second textual datum within the data, wherein the data classification is selected from a group consisting of (i) public data, (ii) private data and (iii) confidential data;

implement one or more deep learning models, which self-train, to identify emerging data points that impact data classification and continuously feed the emerging data points to the machine learning models; and analyze the detected ciphertext within the document data and the image data, and outputs from the one or more machine learning models and the one or more deep learning models to determine a level of sensitive data leakage attributed to each data set.

13. The computer program product of claim 12, wherein the sets of codes further comprise a set of code for causing the one or more computing device to:

determine, within real-time of receiving the data set, whether the data set should be prohibited from transmission to an intended data recipient based on the level of sensitive data leakage attributed to the data set.

14. The computer program product of claim 12, wherein the set of code for causing the one or more computing devices to receive are further configured to cause the one or more computing devices to receive the data sets in unstructured format, and wherein the sets of codes further comprise a set of codes for causing the one or more computing devices to normalize the data sets including reformatting the datasets to a structured format compatible for further processing.

15. The computer program product of claim 12, wherein the sets of codes further comprise a set of code for causing the one or more computing device to:

generate a visual indicator disposed within the document data and the image data that indicates locations within a document or an image of (i) the ciphertext, and (ii) the first textual datum and second textual datum classified as private data and confidential data.

* * * * *